Patented Dec. 9, 1924.

1,518,339

UNITED STATES PATENT OFFICE.

MATTHEW D. MANN, JR., OF ROSELLE, NEW JERSEY, ASSIGNOR TO SETH B. HUNT, TRUSTEE, OF MOUNT KISCO, NEW YORK.

REFINING AND DEODORIZING ISOPROPYL ALCOHOL.

No Drawing.   Application filed March 7, 1921.   Serial No. 450,393.

*To all whom it may concern:*

Be it known that I, MATTHEW D. MANN, Jr., a citizen of the United States, residing at Roselle, in the county of Union and State of New Jersey, have invented a new and useful Improvement in Refining and Deodorizing Isopropyl Alcohol, of which the following is a specification.

The present invention relates to the deodorization or refining of isopropyl alcohol and will be fully understood from the following description.

Isopropyl alcohol, when produced from a source such as the olefine containing gases of oil refineries, cracking still, etc., retains a slight penetrating foreign odor even after purification, for example, by filtration through sawdust to remove hydrocarbons and by fractional distillation.

In accordance with the present invention isopropyl alcohol is refined and deodorized by the action of an oxidizing agent under carefully controlled conditions, whereby the oxidizing action is limited to the impurities present and causing the undesirable odors. As suitable oxidizing agents I may employ an active oxygen yielding salt, such as potassium permanganate in neutral solution, or in the presence of alkali or acid, sodium or potassium dichromate in the presence of acid, hydrogen peroxide, etc.

As an example of the purifying and deodorizing of isopropyl alcohol, the following specific treatment of a sample of alcohol is described:

The alcohol treated is a cut or fraction taken between 80° C. and 87° C. from the distillate from the crude water soluble alcohol derived from the hydrolysis and distillation of the acid extract derived from the treatment of olefine-containing hydrocarbon gas with sulfuric acid under sulfating conditions. This cut contains from 85–87% of isopropyl alcohol and a small proportion of higher alcohols, probably largely secondary butyl alcohol. 1000 gallons of this alcohol is acidified, for example, with one-half gallon of 66° Bé. $H_2SO_4$. The acidified alcohol is then thoroughly agitated with an aqueous solution of about 500 grams (1.1 lbs.) of $KMnO_4$. A slight excess of alkali, for example, NaOH, is then added and the alcohol is redistilled. The action of the oxidizing agent upon the odor-producing impurities in the alcohol is not definitely known; they are so altered in character, however, as not to accompany the alcohol on redistillation. The proportion of oxidizing agent employed is small, being less than 0.1% in the specific example given.

Improvement in odor may be effected by less active oxidizing agents; for example, by blowing with air. The oxidizing action of the reagent in all cases appears to be selective in that the impurities present are oxidized or altered in character without oxidation of the alcohol taking place.

I claim:

1. The process of refining and deodorizing isopropyl alcohol derived from a hydrocarbon source which comprises subjecting the alcohol to be refined to the action of a minute proportion of an oxidizing agent, whereby the odor-producing impurities are oxidized without oxidation of the alcohol.

2. The process of refining and deodorizing isopropyl alcohol derived from petroleum or associated materials, which comprises adding to the alcohol to be refined a small proportion of an active oxygen yielding salt, thereby effecting a controlled oxidation, and separating the alcohol from the oxidized impurities.

3. The process of refining and deodorizing isopropyl alcohol which comprises acidulating the alcohol derived from a hydrocarbon source and thoroughly mixing it with a small proportion of potassium permanganate.

4. The process of refining and deodorizing isopropyl alcohol derived from petroleum or associated materials which comprises subjecting the alcohol to be refined to the action of a small proportion of an oxidizing agent and separating the alcohol from the oxidized impurities.

5. The process of refining and deodorizing isopropyl alcohol derived from petroleum or associated materials which comprises acidulating the alcohol, thoroughly mixing therewith about 0.1% of $KMnO_4$, neutralizing and distilling off the refined alcohol.

MATTHEW D. MANN, JR.